United States Patent
Murashima et al.

(10) Patent No.: US 6,804,437 B2
(45) Date of Patent: Oct. 12, 2004

(54) DIFFRACTION GRATING DEVICE MANUFACTURING METHOD, DIFFRACTION GRATING DEVICE MANUFACTURING APPARATUS, AND DIFFRACTION GRATING DEVICE

(75) Inventors: Kiyotaka Murashima, Yokohama (JP); Ken Hashimoto, Yokohama (JP); Toshikazu Shibata, Yokohama (JP); Akira Inoue, Yokohama (JP); Masaki Ohmura, Yokohama (JP); Masakazu Shigehara, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 72 days.

(21) Appl. No.: 10/377,665

(22) Filed: Mar. 4, 2003

(65) Prior Publication Data

US 2003/0165294 A1 Sep. 4, 2003

(30) Foreign Application Priority Data

Mar. 4, 2002 (JP) ........................................ 2002-057646

(51) Int. Cl.⁷ .............................................. G02B 6/34
(52) U.S. Cl. ........................................................ 385/37
(58) Field of Search .............................. 385/37; 355/53

(56) References Cited

U.S. PATENT DOCUMENTS 6,307,617 B1 * 10/2001 Nishiki et al. ................. 355/53
2002/0081068 A1 * 6/2002 Matsumoto et al. ........... 385/37
2003/0012498 A1 * 1/2003 Ohmura et al. ................ 385/37
2004/0028331 A1 * 2/2004 Ishii et al. ...................... 385/37

FOREIGN PATENT DOCUMENTS

JP 10-48450 2/1998
JP 11-142670 5/1999

OTHER PUBLICATIONS

Meyer, et al. "Birefringence Writing and Erasing in Ultra–Low–Birefringence Fibers by Polarized UV Side–Exposure: Origin and Applications," pp. 368–370.

Ishii, et al. "PDL Reduction of Long–Period Fiber Grating by Rotating Exposure Method," Proc. 27th Eur. Conf. on Opt. Comm. (ECOC'01) pp. 354–355.

* cited by examiner

*Primary Examiner*—Frank G. Font
*Assistant Examiner*—Michael P. Mooney
(74) *Attorney, Agent, or Firm*—McDermott Will & Emery LLP

(57) ABSTRACT

In this diffraction grating device manufacturing method, refractive-index-change-inducing light of a wavelength that induces a change in refractive index is irradiated onto an optical waveguide, thus forming a diffraction grating through refractive index modulation along the longitudinal direction of the optical waveguide. At this time, the position of irradiation of the refractive-index-change-inducing light onto the optical waveguide is swung in a direction perpendicular to the longitudinal direction of the optical waveguide.

7 Claims, 12 Drawing Sheets

DIFFRACTION GRATING DEVICE MANUFACTURING METHOD, DIFFRACTION GRATING DEVICE MANUFACTURING APPARATUS, AND DIFFRACTION GRATING DEVICE

BACKGROUND OF THE INVENTION

1. Field of the Invention

The present invention relates to a diffraction grating device in which a diffraction grating is formed through refractive index modulation along the longitudinal direction of an optical waveguide, and a method and apparatus for manufacturing such a diffraction grating device.

2. Related Background Art

A diffraction grating device is a device in which a diffraction grating is formed through refractive index modulation along the longitudinal direction of an optical waveguide (e.g. an optical fiber). Broadly classifying such diffraction grating devices, Bragg-type ones for which the period of the refractive index modulation is relatively short and which use Bragg reflection, and long-period-type ones for which the period of the refractive index modulation is relatively long and which use phase matching between propagation modes are known. A Bragg-type diffraction grating device is capable of selectively reflecting light of a specific wavelength that satisfies the Bragg condition out of light propagating along the optical waveguide, and is used, for example, as a wavelength filter in an optical communication system. A long-period-type diffraction grating device is capable of selectively giving loss to light of a specific wavelength that satisfies a phase matching condition out of light propagating along the optical waveguide, and is used, for example, as a loss filter in an optical communication system.

Such diffraction grating devices are manufactured as follows. First, an optical waveguide for which the optical waveguiding region is photosensitive is prepared. For example, an optical fiber having a core region comprising silica glass to which $GeO_2$ has been added is prepared. Silica glass to which $GeO_2$ has been added is photosensitive, with the refractive index rising upon being irradiated with ultraviolet light. Refractive-index-change-inducing light of a wavelength that induces such a change in refractive index is thus irradiated onto the optical waveguide via a phase grating mask or an intensity modulating mask while scanning along the longitudinal direction. Through this irradiation, refractive-index-change-inducing light whose intensity is spatially modulated along the longitudinal direction of the optical waveguide is irradiated, and hence refractive index modulation is formed along the longitudinal direction of the optical waveguiding region of the optical waveguide.

SUMMARY OF THE INVENTION

As a result of studying the prior art described above, the present inventors discovered the following problems. A laser light source is used as the light source that outputs the refractive-index-change-inducing light. In general the light outputted from a laser light source has a Gaussian intensity distribution in the radial direction, and the beam diameter is small. Consequently, when such laser light is irradiated as the refractive-index-change-inducing light onto the optical waveguide, in the case that the accuracy of the direction of emission of the refractive-index-change-inducing light from the light source is poor, or the case that the accuracy of alignment of optical elements on the optical path from the light source to the optical waveguide is poor, the refractive-index-change-inducing light may not be irradiated with uniform intensity in the radial direction onto the part of the optical waveguide that is photosensitive, or the refractive-index-change-inducing light may not be irradiated with the desired intensity distribution when scanning along the longitudinal direction.

If the refractive-index-change-inducing light is not irradiated with uniform intensity in the radial direction, or if the refractive-index-change-inducing light is not irradiated with the desired intensity distribution when scanning along the longitudinal direction, then the diffraction grating device obtained will not have the desired optical characteristics. In particular, with a diffraction grating device in which not only the core region but also part of the cladding region is made to be photosensitive and refractive index modulation is formed over both the core region and the cladding region, or a diffraction grating device in which the grating plane of refractive index modulation formed over both the core region and the cladding region is inclined, or a diffraction grating device in which the amplitude distribution of the refractive index modulation along the longitudinal direction is made to have a prescribed functional form, the intended desired optical characteristics will not be obtained.

The present invention was devised to resolve the problems described above; it is an object of the present invention to provide a method and apparatus that enable a diffraction grating device having desired optical characteristics to be manufactured easily.

The present invention provides a diffraction grating device manufacturing method, in which refractive-index-change-inducing light of a wavelength that induces a change in refractive index is irradiated onto an optical waveguide, thus forming a diffraction grating through refractive index modulation along the longitudinal direction of the optical waveguide, wherein the position of irradiation of the refractive-index-change-inducing light onto the optical waveguide is swung in a direction perpendicular to the longitudinal direction of the optical waveguide.

The present invention also provides a diffraction grating device manufacturing apparatus that irradiates refractive-index-change-inducing light of a wavelength that induces a change in refractive index onto an optical waveguide, thus forming a diffraction grating through refractive index modulation along the longitudinal direction of the optical waveguide, the diffraction grating device manufacturing apparatus comprising (1) a light source that outputs the refractive-index-change-inducing light, (2) irradiation means for irradiating the refractive-index-change-inducing light that has been outputted from the light source onto the optical waveguide, and (3) swinging means for swinging the position of irradiation of the refractive-index-change-inducing light onto the optical waveguide by the irradiation means in a direction perpendicular to the longitudinal direction of the optical waveguide.

Moreover, the present invention also provides a diffraction grating device manufactured using the diffraction grating device manufacturing method described above.

In the present invention, refractive-index-change-inducing light of a wavelength that induces a change in refractive index is irradiated onto an optical waveguide, and the position of irradiation of the refractive-index-change-inducing light onto the optical waveguide is swung in a direction perpendicular to the longitudinal direction of the optical waveguide. A diffraction grating device manufactured in this way has a diffraction grating formed through refractive index modulation along the longitudinal direction of the optical waveguide; the refractive-index-change-inducing light is irradiated with a desired intensity distribution onto a photosensitive region of the optical waveguide in which the diffraction grating is to be formed, and hence the diffraction grating device has desired optical characteristics.

It is preferable for the position of irradiation of the refractive-index-change-inducing light onto the optical waveguide to be swung with an amplitude of at least 30 μm in the direction perpendicular to the longitudinal direction of the optical waveguide. Moreover, it is preferable for the position of irradiation of the refractive-index-change-inducing light onto the optical waveguide to be scanned at a scanning speed $v_S$ in the longitudinal direction of the optical waveguide, and the position of irradiation of the refractive-index-change-inducing light onto the optical waveguide to be swung at a swing speed $v_B$, which is faster than the scanning speed $v_S$, in the direction perpendicular to the longitudinal direction of the optical waveguide. As a result, the intensity distribution of the refractive-index-change-inducing light irradiated onto the photosensitive region of the optical waveguide in which the diffraction grating is to be formed becomes yet closer to the desired distribution.

The present invention can be understood more fully through the following detailed description and the attached drawings; however, the following is merely given for illustrative purposes, and should not be regarded as limiting the present invention.

DESCRIPTION OF THE PREFERRED EMBODIMENTS

Figure 1:
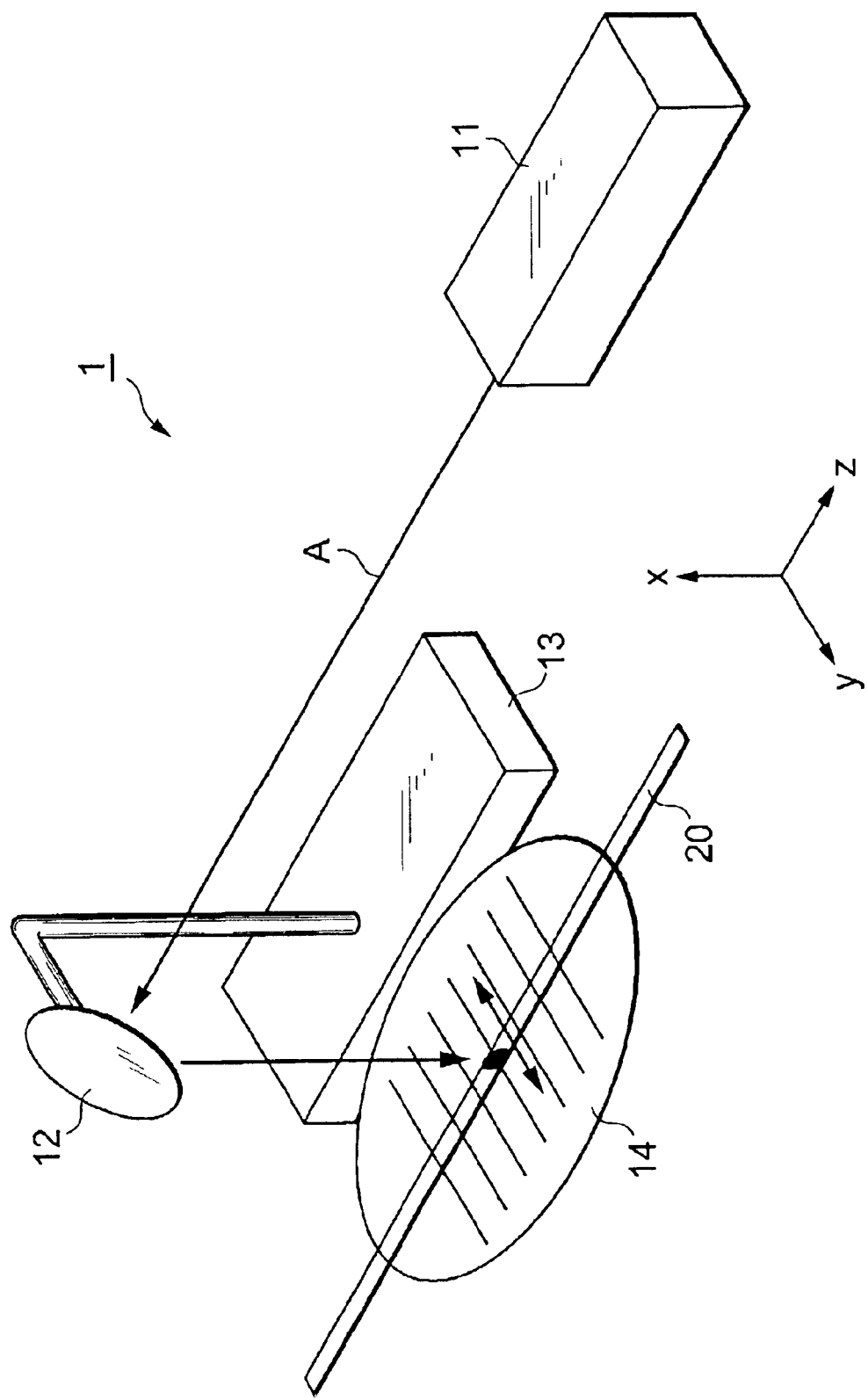
FIG. 1 is a perspective view of a diffraction grating device manufacturing apparatus according to an embodiment of the present invention.

Following is a detailed description of embodiments of the present invention, with reference to the attached drawings. Note that in the description of the drawings, elements that are the same as one another are given the same reference numeral, and redundant repeated description is omitted.

FIG. 1 is a perspective view of a diffraction grating device manufacturing apparatus 1 according to an embodiment of the present invention. The diffraction grating device manufacturing apparatus 1 shown in FIG. 1 irradiates refractive-index-change-inducing light A onto an optical fiber 20, which is an optical waveguide, thus manufacturing a diffraction grating device. The diffraction grating device manufacturing apparatus 1 comprises a light source 11, a mirror 12, a stage 13, and a phase grating mask 14. Note that an xyz rectangular coordinate system having the z-axis parallel to the longitudinal direction of the optical fiber 20 is also shown in FIG. 1.

The light source 11 outputs light (the refractive-index-change-inducing light A) of a wavelength that induces a change in the refractive index in a region of the optical fiber 20 that is photosensitive. For example, it is suitable to use a KrF excimer laser light source that outputs ultraviolet laser light of wavelength 248 nm. The light source 11 outputs the refractive-index-change-inducing light A in the z-axis direction, and the mirror 12 reflects the refractive-index-change-inducing light A, outputting the refractive-index-change-inducing light A in the x-axis direction. The stage 13 moves the mirror 12 in the z-axis direction. The phase grating mask 14 is a flat silics glass plate having a phase grating formed on one surface thereof, and is disposed parallel to the yz-plane.

Figure 2A:
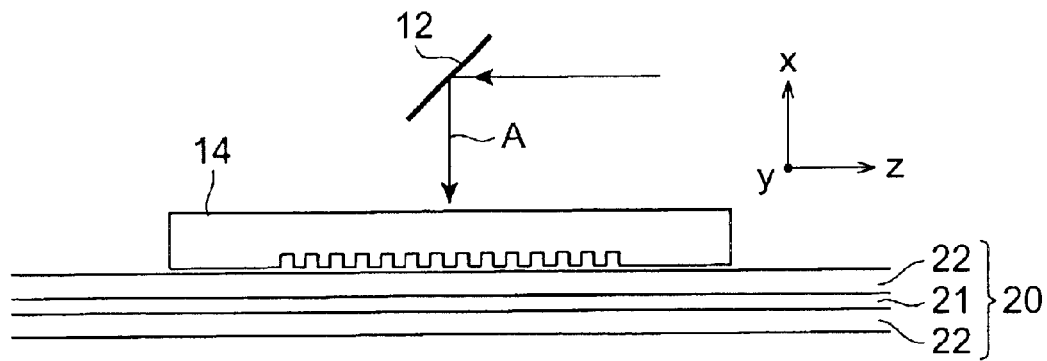
FIGS. 2A and 2B are views showing the arrangement of a phase grating mask and an optical fiber.
Figure 2B:
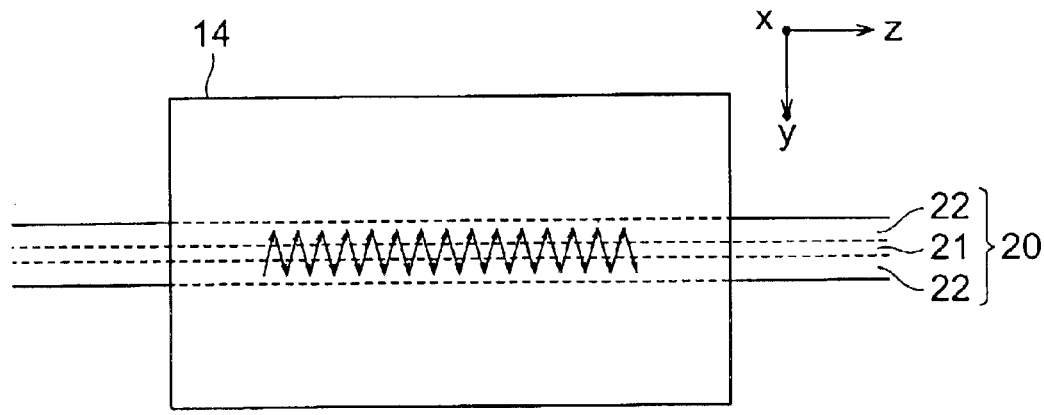

FIGS. 2A and 2B are views showing the arrangement of the phase grating mask 14 and the optical fiber 20. FIG. 2A is a sectional view through a plane that contains the optical axis of the optical fiber 20 and is parallel to the xz-plane, and FIG. 2B is a view from the x-axis direction (the direction in which the refractive-index-change-inducing light A is incident on the phase grating mask 14). Moreover, the trajectory of the position of incidence of the refractive-index-change-inducing light A onto the phase grating mask 14 is also shown in FIG. 2B. The optical fiber 20 comprises a core region 21 that comprises silica glass to which $GeO_2$ has been added and is photosensitive, and a cladding region 22 that surrounds the core region 21 and comprises silica glass.

As shown in FIG. 2A, the phase grating mask 14 is disposed such that the surface thereof on which the phase grating is formed faces the optical fiber 20. When the refractive-index-change-inducing light A is incident on the phase grating mask 14, diffracted light of the order +1 and diffracted light of order −1 are generated from the refractive-index-change-inducing light A through the diffraction effect of the phase grating, and the diffracted light of order +1 and the diffracted light of order −1 interfere with one another, whereby interference fringes are formed along the longitudinal direction in the core region 21 of the optical fiber 20. Through these interference fringes, refractive index modulation is formed along the longitudinal direction in the photosensitive core region 21 of the optical fiber 20.

The position of incidence of the refractive-index-change-inducing light A onto the phase grating mask 14 is moved so as to trace out the zigzag trajectory shown in FIG. 2B. That is, the position of the irradiation of the refractive-index-change-inducing light A onto the optical fiber 20 is scanned in the z-axis direction, and at the same time is swung in the y-axis direction. The scanning of the irradiation position in the z-axis direction is carried out by moving the mirror 12 using the stage 13 (scanning means). Moreover, the swinging of the irradiation position in the y-axis direction may be carried out, for example, by making the orientation of the reflecting surface of the mirror 12 oscillate, or by moving the optical fiber 20 and the phase grating mask 14 as a single body using a stage (not shown) that is provided separately to the stage 13 in the y-axis direction (irradiation means).

The swinging in the y-axis direction of the position of irradiation of the refractive-index-change-inducing light A is carried out such that the whole width of the photosensitive core region 21 of the optical fiber 20 falls within the range of the swinging movement. Through the irradiation position being swung in the y-axis direction in this way, even in the case that the accuracy of the direction of emission of the refractive-index-change-inducing light A from the light source 11 is poor, or the case that the accuracy of alignment of optical elements on the optical path from the light source 11 to the optical fiber 20 is poor, a diffraction grating device having desired optical characteristics can easily be manufactured.

Moreover, it is preferable for the amplitude of the swing in the y-axis direction of the position of irradiation of the refractive-index-change-inducing light A to be at least 30 $\mu$m. If the amplitude of the swing is at least 30 $\mu$m, then the refractive-index-change-inducing light A is irradiated uniformly in the radial direction onto the core region 21 of the optical fiber 20. Moreover, it becomes such that, during the scanning in the z-axis direction of the position of irradiation of the refractive-index-change-inducing light A, the whole width of the photosensitive core region 21 of the optical fiber 20 falls within the range of the swing in the y-axis direction of the position of irradiation of the refractive-index-change-inducing light A at each point during the scanning, and hence the refractive-index-change-inducing light is irradiated with the desired intensity distribution along the z-axis direction of the core region 21.

Moreover, taking the speed of the scanning in the z-axis direction of the position of irradiation of the refractive-index-change-inducing light A to be $v_S$, and taking the speed of the swing in the y-axis direction of the position of irradiation of the refractive-index-change-inducing light A to be $v_B$, it is preferable for the swing speed $v_B$ to be faster than the scanning speed $v_S$. As a result, the distribution of the irradiation of the refractive-index-change-inducing light A in the radial direction of the core region 21 becomes yet more uniform, and moreover the distribution of the irradiation of the refractive-index-change-inducing light A along the z-axis direction of the core region 21 becomes yet closer to the desired distribution.

Figure 3:
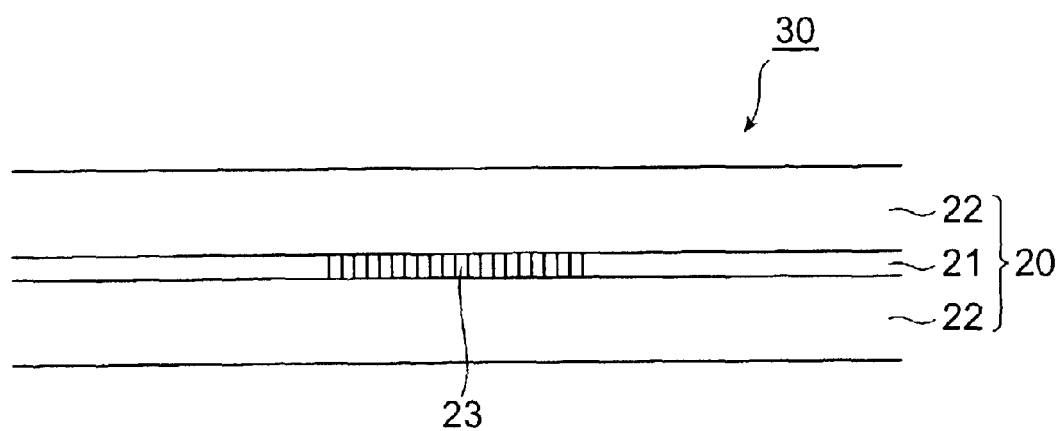
FIG. 3 is an explanatory view of a manufactured diffraction grating device.

FIG. 3 is an explanatory view of a diffraction grating device 30 manufactured through the diffraction grating device manufacturing method according to the present embodiment, using the diffraction grating device manufacturing apparatus 1 according to the present embodiment. FIG. 3 shows a section of the diffraction grating device 30 through a plane containing the optical axis. The diffraction grating device 30 has a diffraction grating 23 formed therein through refractive index modulation over a certain range along the longitudinal direction of the core region 21 of the optical fiber 20 described above. The diffraction grating device 30 selectively reflects light of a specific wavelength that satisfies the Bragg condition in the diffraction grating 23 out of light that has propagated along the core region 21 and reached the diffraction grating 23, causing this reflected light to propagate back in the opposite direction, and transmitting light of the other wavelengths. With the diffraction grating device 30, the formation of the refractive index modulation is uniform in the radial direction, and moreover the amplitude distribution of the refractive index modulation along the longitudinal direction is the desired distribution, and hence the diffraction grating device 30 has the desired optical characteristics (reflection characteristics, wavelength dispersion characteristics).

Figure 4:
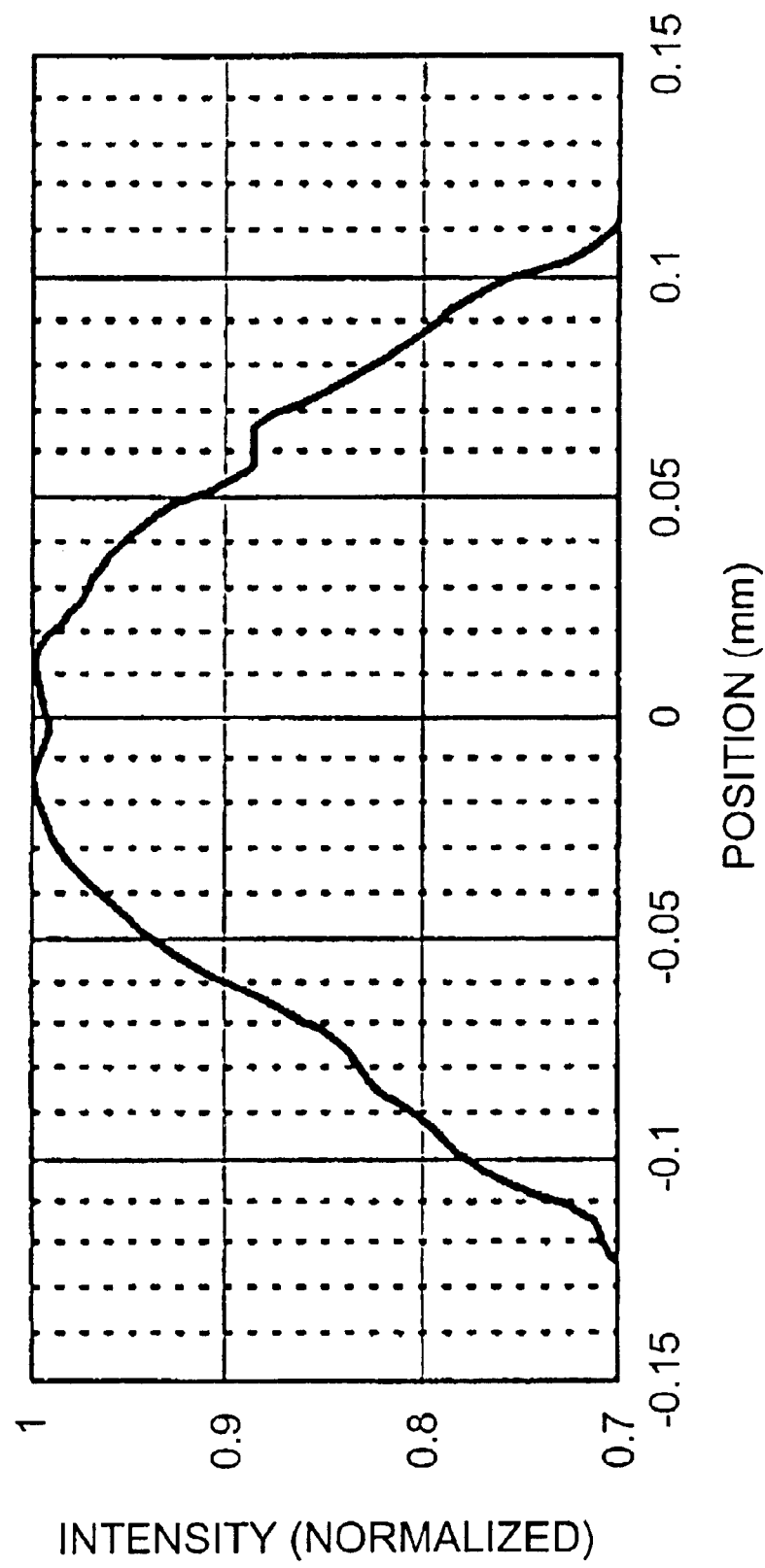
FIG. 4 is a graph showing the intensity distribution in the y-axis direction of refractive-index-change-inducing light irradiated onto the optical fiber.

Next, a description will be given of specific examples of the diffraction grating device manufacturing method according to the present embodiment. FIG. 4 is a graph showing the intensity distribution in the y-axis direction of the refractive-index-change-inducing light irradiated onto an optical fiber. This graph shows the intensity distribution in the y-axis direction of the refractive-index-change-inducing light for the case that the refractive-index-change-inducing light was condensed using a cylindrical lens and then irradiated onto the optical fiber via a phase grating mask. As shown by the graph, the intensity distribution in the y-axis direction of the refractive-index-change-inducing light irradiated onto the optical fiber is Gaussian. In each of the examples described below, refractive-index-change-inducing light having such an intensity distribution in the y-axis direction is irradiated onto an optical fiber.

Figure 5A:
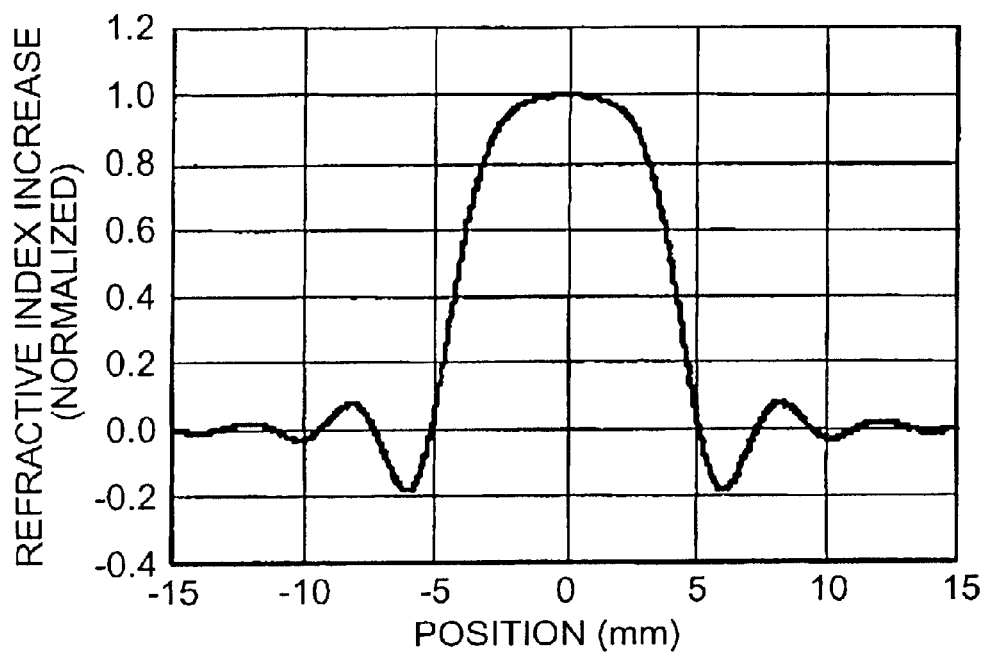
FIGS. 5A and 5B are graphs showing various characteristics of a diffraction grating device of Example 1.
Figure 5B:
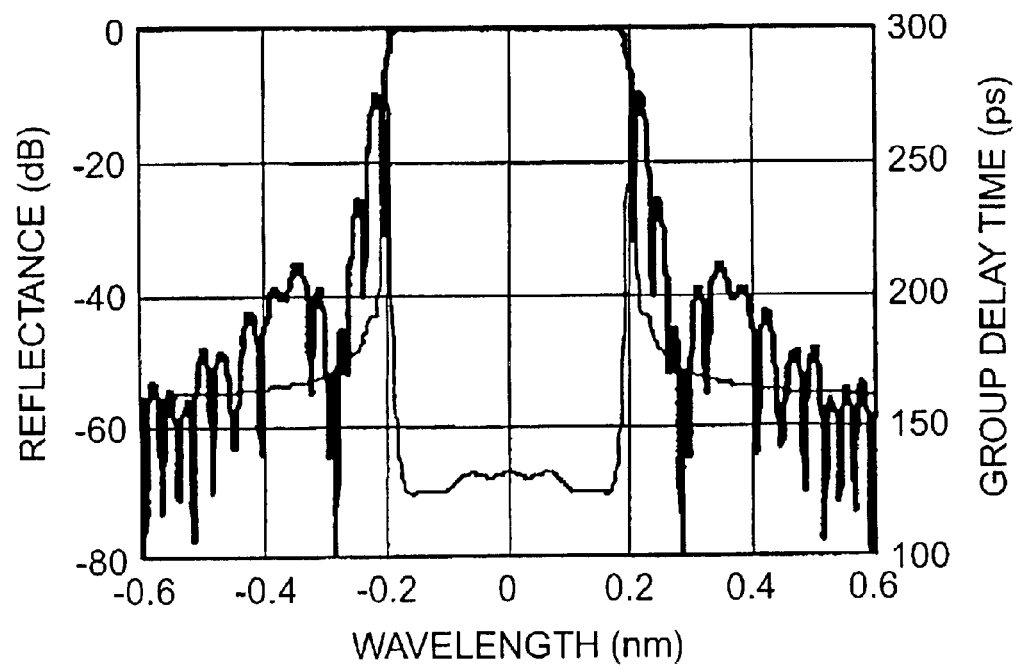
Figure 6A:
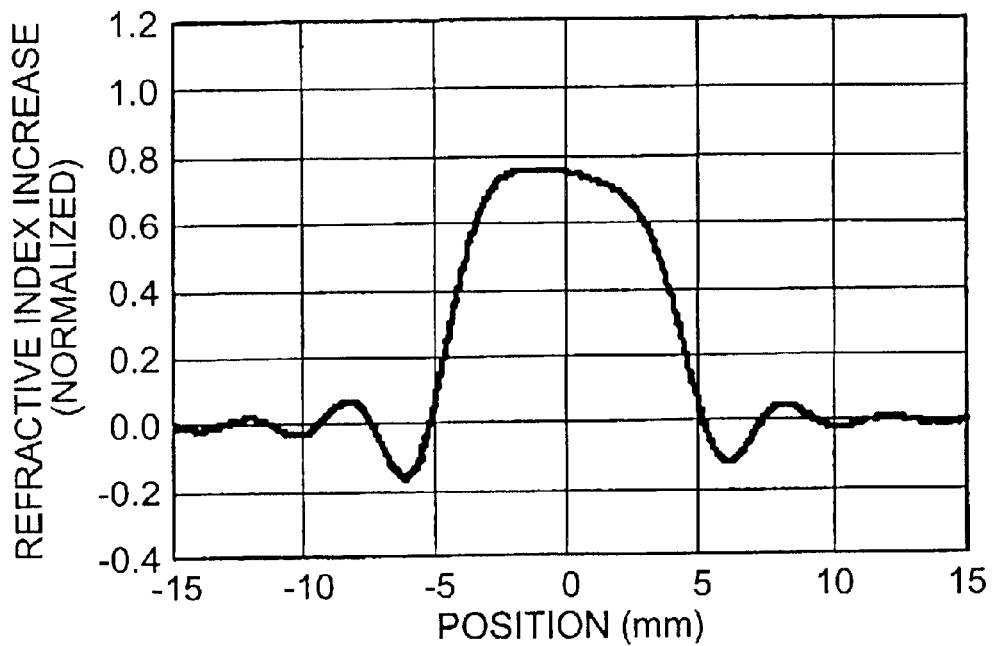
FIGS. 6A and 6B are graphs showing various characteristics of a diffraction grating device of Comparative Example 1.
Figure 6B:
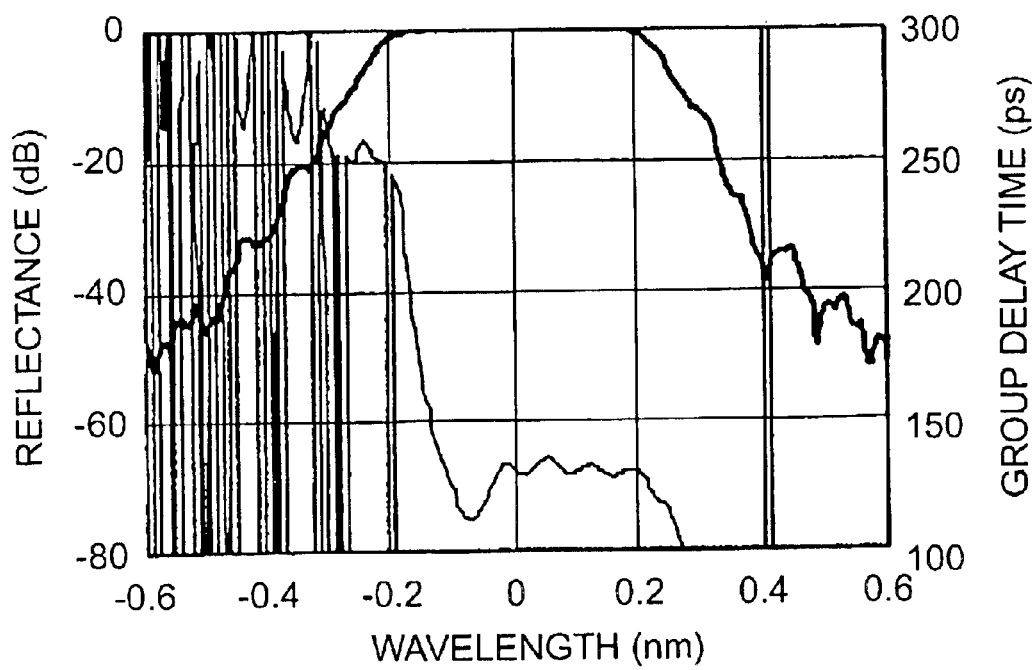

A diffraction grating device of Example 1 was formed in an optical fiber having a core region and a cladding region as shown in FIG. 3. FIGS. 5A and 5B are graphs showing various characteristics of the diffraction grating device of Example 1, and FIGS. 6A and 6B are graphs showing various characteristics of the diffraction grating device of a Comparative Example 1. FIGS. 5A and 6A show the amplitude distribution of the refractive index modulation along the longitudinal direction, and FIGS. 5B and 6B show the wavelength dependence of each of the reflectance and the group delay time.

With the diffraction grating device of Example 1, the amplitude distribution of the refractive index modulation along the longitudinal direction has been made to have a prescribed functional form (FIG. 5A), and the group delay time has been made to be approximately constant (i.e. the absolute value of the wavelength dispersion has been made to be low) within the reflection zone (FIG. 5B). The diffraction grating device of Example 1 was manufactured through the manufacturing method described above in which the position of irradiation of the refractive-index-change-inducing light onto the optical fiber is swung in the y-axis direction, and hence the desired characteristics were obtained.

In contrast, with the diffraction grating device of Comparative Example 1, the characteristics shown in FIGS. 5A and 5B were aimed for, but the position of irradiation of the refractive-index-change-inducing light was not swung in they-axis direction. With the diffraction grating device of Comparative Example 1, the amplitude distribution of the refractive index modulation along the longitudinal direction thus has not become the prescribed functional form, with the amplitude of the refractive index modulation becoming less than the design value as one moves to the +z side (FIG. 6A). Moreover, with the diffraction grating device of Comparative Example 1, the reflection characteristic outside the reflection zone is poor, and the group delay characteristic within the reflection zone is also poor (FIG. 6B).

Figure 7:
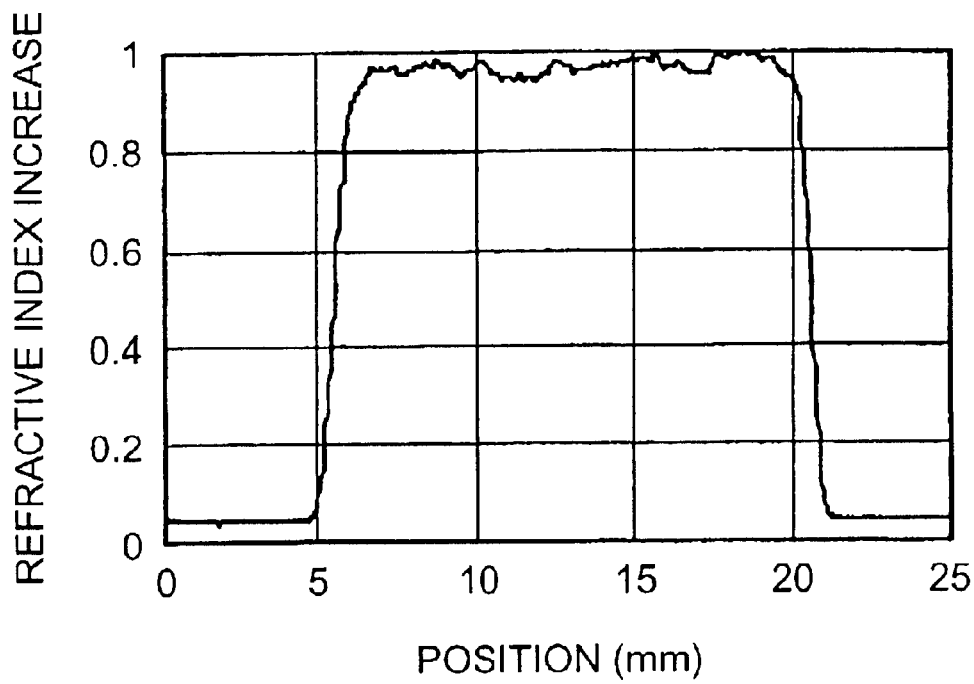
FIG. 7 is a graph showing the amplitude distribution of refractive index modulation along the longitudinal direction of a diffraction grating device of Example 2.
Figure 8:
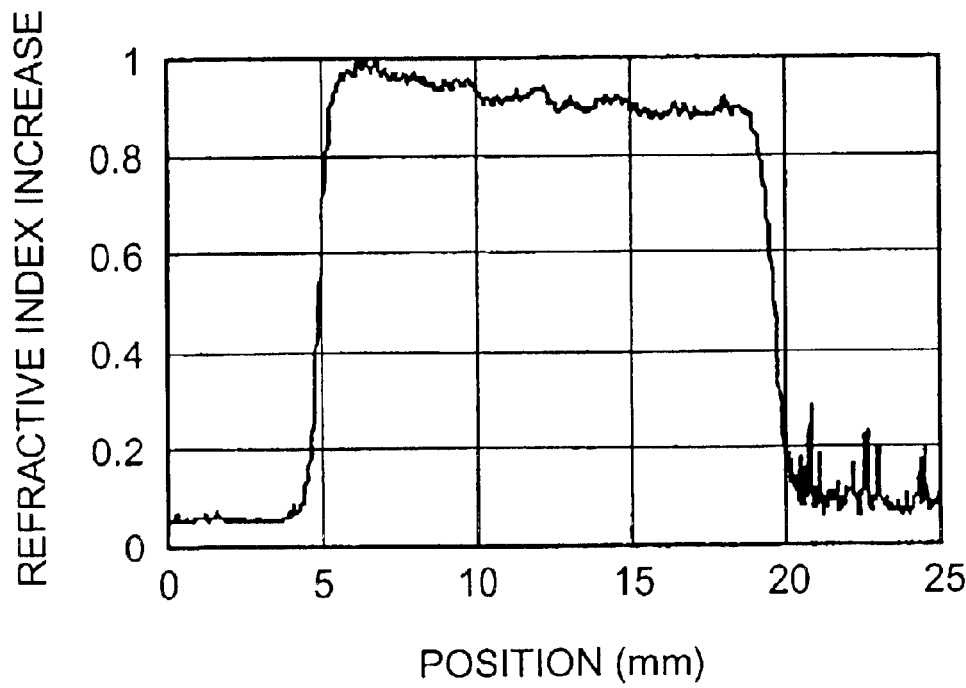
FIG. 8 is a graph showing the amplitude distribution of refractive index modulation along the longitudinal direction of a diffraction grating device of Comparative Example 2.

A diffraction grating device of Example 2 was also formed in an optical fiber having a core region and a cladding region as shown in FIG. 3. FIG. 7 is a graph showing the amplitude distribution of the refractive index modulation along the longitudinal direction of the diffraction grating device of Example 2, and FIG. 8 is a graph showing the amplitude distribution of the refractive index modulation along the longitudinal direction of a diffraction grating device of a Comparative Example 2. The diffraction grating devices of Example 2 and Comparative Example 2 were each manufactured with the intention that the amplitude of the refractive index modulation along the longitudinal direction would be constant.

The diffraction grating device of Example 2 was manufactured through the manufacturing method described above in which the position of irradiation of the refractive-index-change-inducing light onto the optical fiber is swung in the y-axis direction, and hence the desired refractive index modulation amplitude was obtained (FIG. 7). In contrast, the diffraction grating device of Comparative Example 2 was manufactured without swinging the position of irradiation of the refractive-index-change-inducing light in the y-axis direction, and hence the desired refractive index modulation amplitude was not obtained (FIG. 8).

Figure 9A:
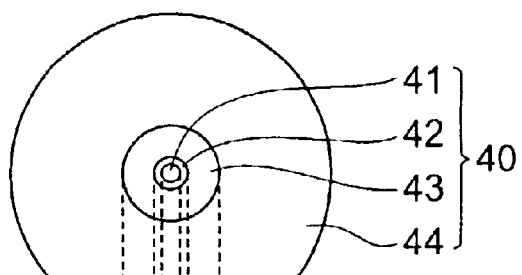
FIGS. 9A to 9C are explanatory views of an optical fiber that is to become a diffraction grating device of Example 3.
Figure 9B:
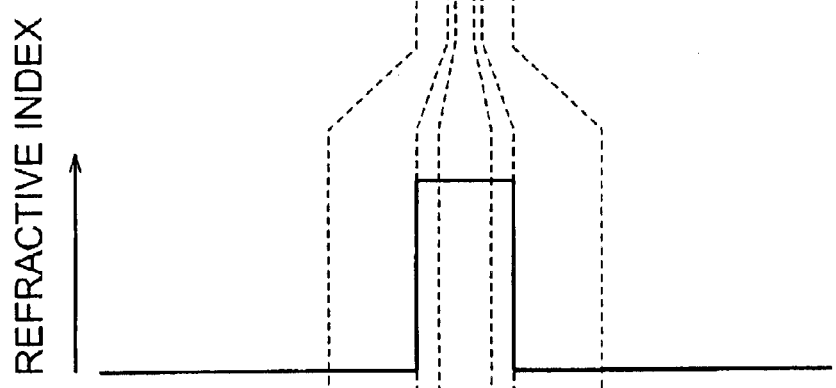
Figure 9C:
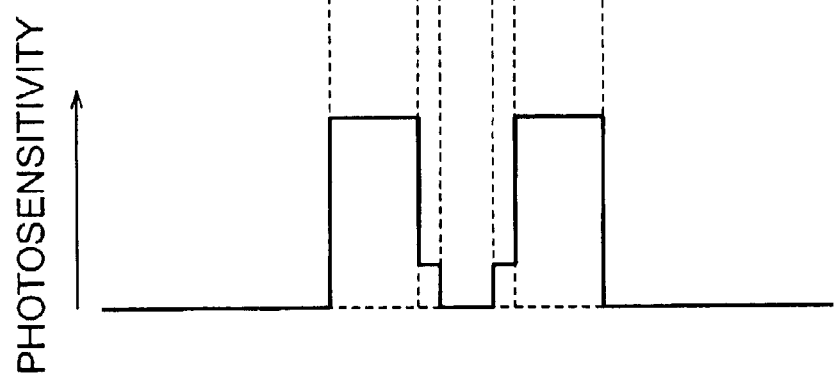
Figure 10:
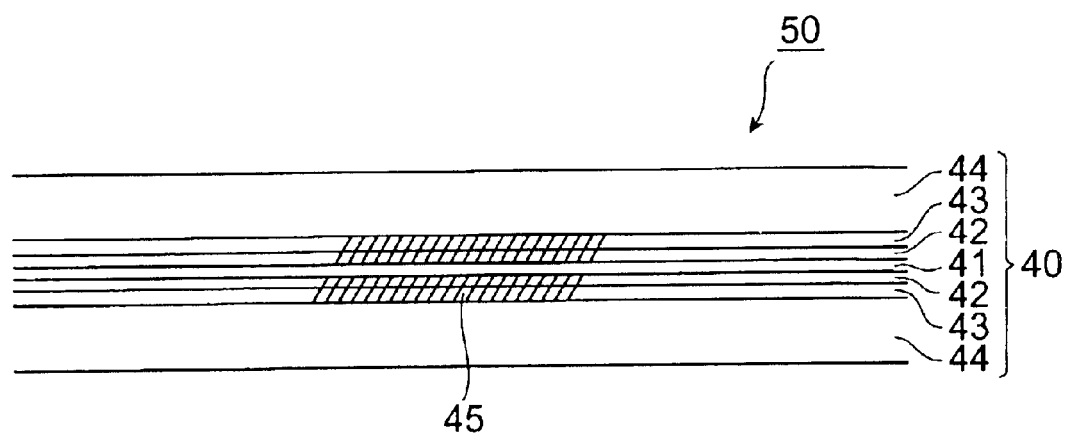
FIG. 10 is an explanatory view of the diffraction grating device of Example 3.

A diffraction grating device of Example 3 was formed in an optical fiber 40 having a structure as shown in FIGS. 9A to 9C, and has a structure as shown in FIG. 10. FIGS. 9A to 9C are explanatory views of the optical fiber 40 that becomes the diffraction grating device 50 of Example 3. FIG. 9A shows a section of the optical fiber 40 through a plane perpendicular to the optical axis, FIG. 9B shows the refractive index distribution in the radial direction for the optical fiber 40, and FIG. 9C shows the photosensitivity distribution in the radial direction for the optical fiber 40. FIG. 10 is an explanatory view of the diffraction grating device 50 of Example 3, and shows a section through a plane containing the optical axis.

The optical fiber 40 comprises, in order from the optical axis outwards, an inner core region 41, an outer core region 42, an inner cladding region 43, and an outer cladding region 44 (FIG. 9A). Prescribed additives (Ge, B, etc.) are contained in each of the regions, and the refractive index of each of the inner core region 41 and the outer core region 42 is set to be higher than the refractive index of each of the inner cladding region 43 and the outer cladding region 44 (FIG. 9B). Moreover, the photosensitivity is made to be highest in the inner cladding region 43, and next highest in the outer core region 42 (FIG. 9C). The outside diameter of the inner cladding region 43 is approximately 20 μm.

The diffraction grating device 50 of Example 3 has a diffraction grating 45 formed therein through refractive index modulation over both the outer core region 42 and the inner cladding region 43 in a certain range along the longitudinal direction of the optical fiber 40, and the grating plane of the diffraction grating 45 is inclined (FIG. 10), i.e. the grating plane of the diffraction grating 45 and the optical axis of the optical fiber 40 are not orthogonal to one another. Such a diffraction grating device 50 selectively reflects light of a specific wavelength that satisfies the Bragg condition in the diffraction grating 45 out of light that has propagated along the core region (the inner core region 41 and the outer core region 42) and reached the diffraction grating 45, causing most of this reflected light to radiate into the cladding region (the inner cladding region 43 and the outer cladding region 44), and transmitting light of other wavelengths.

Figure 11:
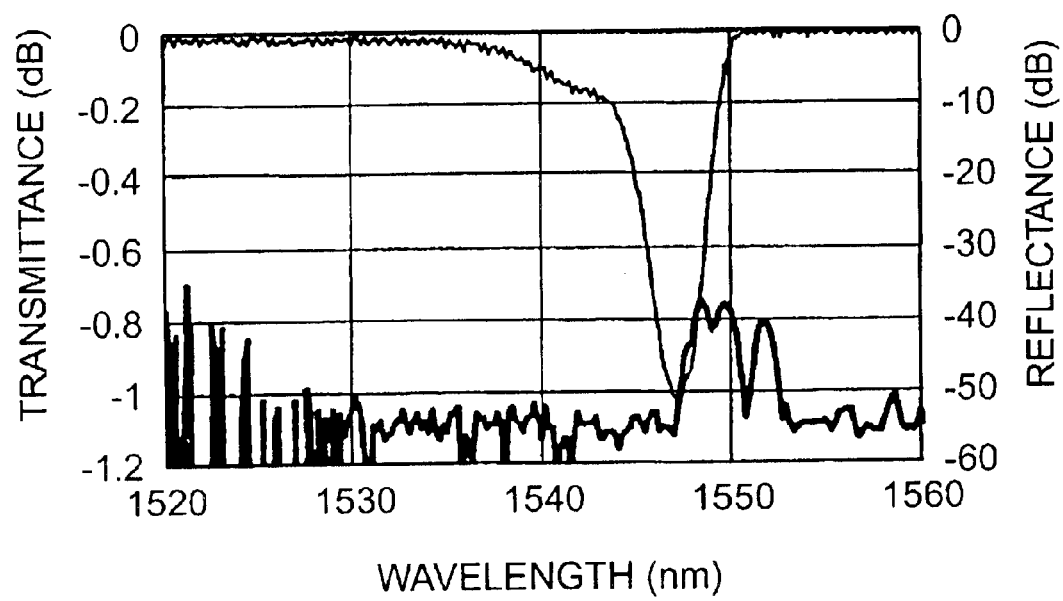
FIG. 11 is a graph showing the wavelength dependence of each of the transmittance and the reflectance for the diffraction grating device of Example 3.
Figure 12:
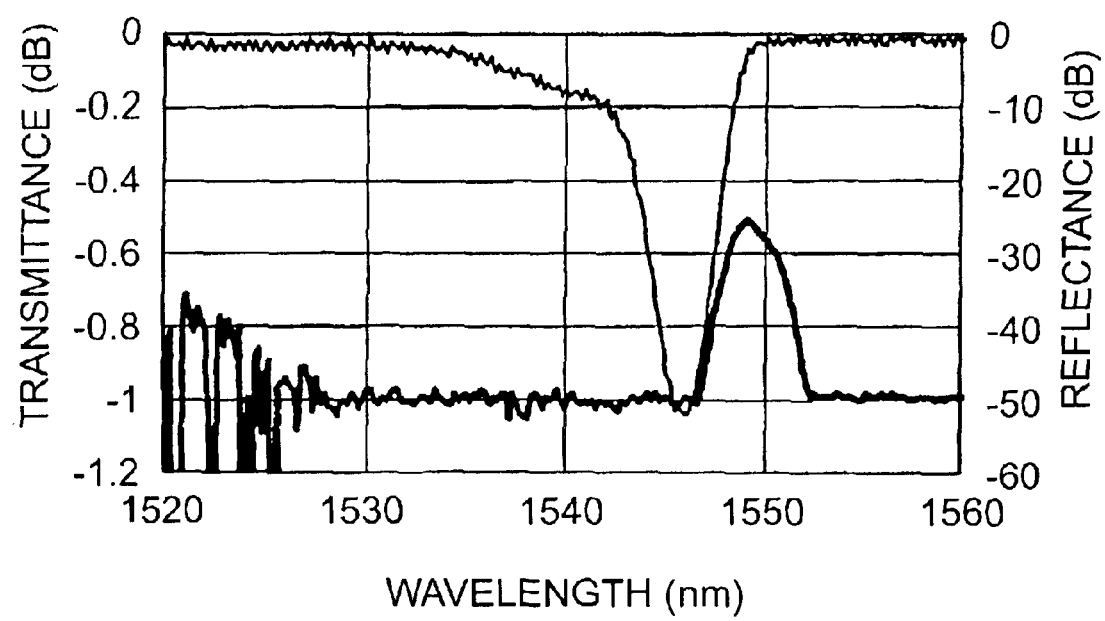
FIG. 12 is a graph showing the wavelength dependence of each of the transmittance and the reflectance for a diffraction grating device of Comparative Example 3.

FIG. 11 is a graph showing the wavelength dependence of each of the transmittance and the reflectance for the diffraction grating device of Example 3, and FIG. 12 is a graph showing the wavelength dependence of each of the transmittance and the reflectance for the diffraction grating device of a Comparative Example 3. The diffraction grating device of Example 3 was manufactured through the method described above in which the position of irradiation of the refractive-index-change-inducing light onto the optical fiber is swung in the y-axis direction, and hence the refractive-index-change-inducing light is irradiated uniformly in the radial direction, and thus the reflectance is kept low as desired (FIG. 11). In contrast, the diffraction grating device of Comparative Example 3 was manufactured without swinging the position of irradiation of the refractive-index-change-inducing light in the y-axis direction, and hence the refractive-index-change-inducing light was irradiated mainly onto the outer core region 42, and thus the reflectance became high (FIG. 12).

Figure 13A:
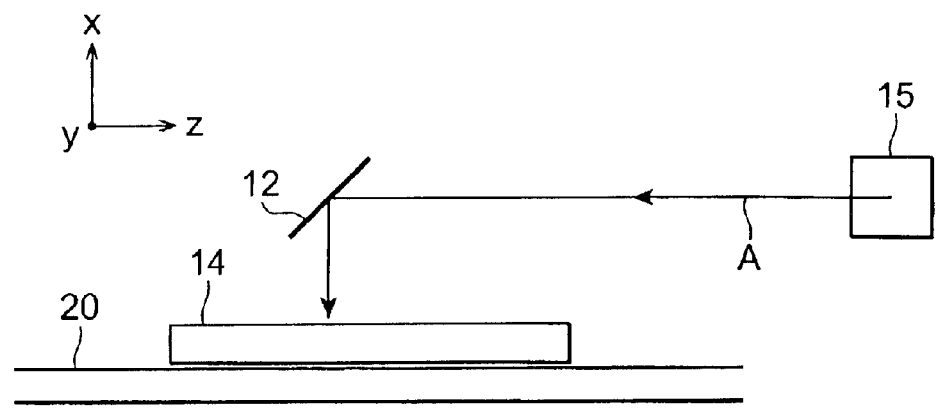
FIGS. 13A and 13B are views showing the constitution of another swinging means.
Figure 13B:
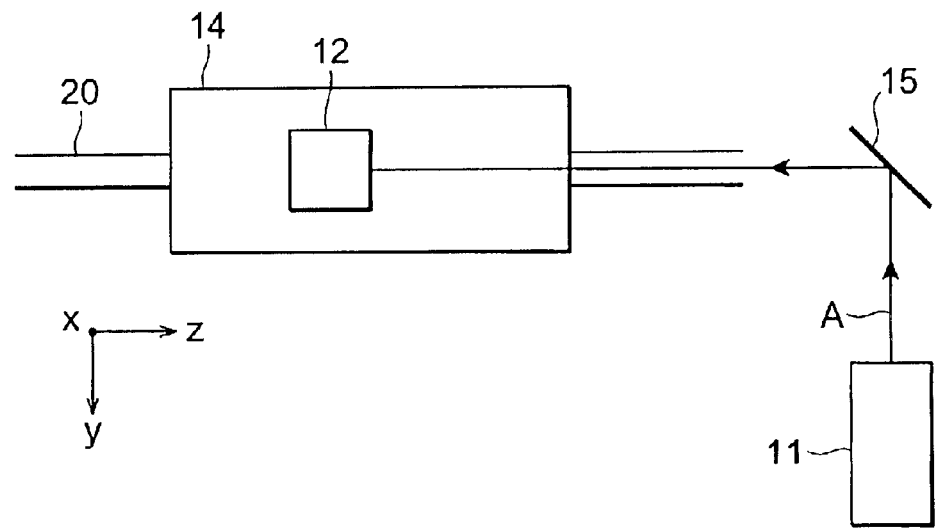

Note that the present invention is not limited to the embodiments described above, but rather various modifications are possible. For example, the swinging means for swinging the position of irradiation of the refractive-index-change-inducing light onto the optical fiber in a direction perpendicular to the longitudinal direction of the optical fiber (the y-axis direction) may have another form. For example, the swinging means may have the constitution shown in FIGS. 13A and 13B. FIG. 13A is a view from the y-axis direction, and FIG. 13B is a view from the x-axis direction. With the constitution shown in FIGS. 13A and 13B, the refractive-index-change-inducing light A outputted from the light source 11 initially proceeds in the y-axis direction, is then reflected by a mirror 15 and proceeds in the z-axis direction, and is then reflected by the mirror 12, proceeds in the x-axis direction, and is incident on the phase grating mask 14. The mirror 15 can be swung in the y-axis direction. Through the swing of the mirror 15 in the y-axis direction, the position of irradiation of the refractive-index-change-inducing light A onto the optical fiber 20 is swung in the y-axis direction.

Figure 14A:
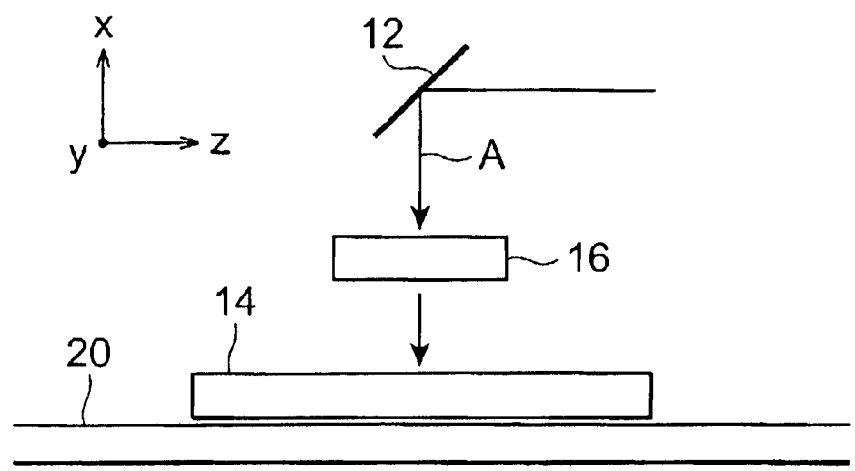
FIGS. 14A and 14B are views showing the constitution of another swinging means.
Figure 14B:
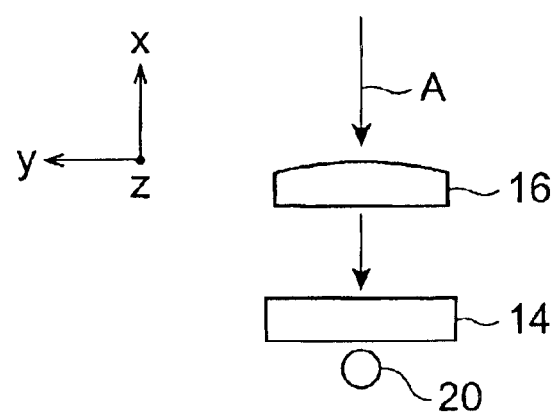

Moreover, the swinging means may be constituted as shown in FIGS. 14A and 14B. FIG. 14A is a view from the y-axis direction, and FIG. 14B is a view from the z-axis direction. With the constitution shown in FIGS. 14A and 14B, a cylindrical lens 16 is provided between the mirror 12 and the phase grating mask 14. The cylindrical lens 16 can be swung in the y-axis direction. Through the swing of the cylindrical lens 16 in the y-axis direction, the position of irradiation of the refractive-index-change-inducing light A onto the optical fiber 20 is moved back-and-forth in the y-axis direction.

Moreover, in the embodiments described above, an explanation was given for a case in which a diffraction grating 23 or 45 is formed in a optical fiber 20 or 40 as the diffraction grating device 1; however, there is no limitation to this, but rather the present invention can also be applied to the case of forming a diffraction grating in a planar waveguide as the optical waveguide.

Moreover, in the embodiments described above, an explanation was given regarding the manufacture of a diffraction grating device having a short-period-type grating via a phase grating mask 14; however, there is no limitation to this, but rather the present invention can also be applied to the manufacture of a diffraction grating device having a long-period-type grating via an intensity modulating mask.

As described in detail above, according to the present invention, refractive-index-change-inducing light of a wavelength that induces a change in refractive index is irradiated onto an optical waveguide, and the position of irradiation of the refractive-index-change-inducing light onto the optical waveguide is swung in a direction perpendicular to the longitudinal direction of the optical waveguide. A diffraction grating device manufactured in this way will have desired optical characteristics, since the refractive-index-change-inducing light is irradiated with the desired intensity distribution onto the photosensitive region of the optical waveguide in which the diffraction grating is to be formed.

It is clear from the above description of the present invention that the present invention can be modified in various ways. Such modifications should not be considered to deviate from the idea and scope of the present invention, and all improvements that would be obvious to a persons killed in the art are deemed to be included in the under mentioned claims.

What is claimed is:

1. A diffraction grating device manufacturing method, in which refractive-index-change-inducing light of a wavelength that induces a change in refractive index is irradiated onto an optical waveguide, thus forming a diffraction grating through refractive index modulation along the longitudinal direction of said optical waveguide;

wherein the position of irradiation of said refractive-index-change-inducing light onto said optical waveguide is swung in a direction perpendicular to the longitudinal direction of said optical waveguide.

2. The diffraction grating device manufacturing method according to claim 1, wherein the position of irradiation of said refractive-index-change-inducing light onto said optical waveguide is swung with an amplitude of at least 30 $\mu$m in the direction perpendicular to the longitudinal direction of said optical waveguide.

3. The diffraction grating device manufacturing method according to claim 1, wherein the position of irradiation of said refractive-index-change-inducing light onto said optical waveguide is scanned at a scanning speed $v_S$ in the longitudinal direction of said optical waveguide, and the position of irradiation of said refractive-index-change-inducing light onto said optical waveguide is swung at a swing speed $v_B$, which is faster than said scanning speed $v_S$, in the direction perpendicular to the longitudinal direction of said optical waveguide.

4. A diffraction grating device manufacturing apparatus that irradiates refractive-index-change-inducing light of a wavelength that induces a change in refractive index onto an optical waveguide, thus forming a diffraction grating through refractive index modulation along the longitudinal direction of said optical waveguide, the diffraction grating device manufacturing apparatus comprising:

a light source that outputs said refractive-index-change-inducing light;

irradiation means for irradiating said refractive-index-change-inducing light that has been outputted from said light source onto said optical waveguide; and swinging means for swinging the position of irradiation of said refractive-index-change-inducing light onto said optical waveguide by said irradiation means in a direction perpendicular to the longitudinal direction of said optical waveguide.

5. The diffraction grating device manufacturing apparatus according to claim 4, wherein said swinging means swings the position of irradiation of said refractive-index-change-inducing light onto said optical waveguide with an amplitude of at least 30 $\mu$m in the direction perpendicular to the longitudinal direction of said optical waveguide.

6. The diffraction grating device manufacturing apparatus according to claim 4, further comprising:

scanning means for scanning the position of irradiation of said refractive-index-change-inducing light onto said optical waveguide by said irradiation means in the longitudinal direction of said optical waveguide;

wherein said swinging means swings the position of irradiation of said refractive-index-change-inducing light at a swing speed $v_B$ that is faster than the scanning speed $v_S$ of the scanning by said scanning means.

7. A diffraction grating device, manufactured using the diffraction grating device manufacturing method according to claim 1.

* * * * *